United States Patent
Hotta et al.

(10) Patent No.: US 9,206,734 B2
(45) Date of Patent: Dec. 8, 2015

(54) CONTROL APPARATUS FOR INTERNAL COMBUSTION ENGINE

(75) Inventors: Shintaro Hotta, Susono (JP); Akira Eiraku, Sunto-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 113 days.

(21) Appl. No.: 13/378,896

(22) PCT Filed: Mar. 17, 2010

(86) PCT No.: PCT/JP2010/054498
§ 371 (c)(1),
(2), (4) Date: Dec. 16, 2011

(87) PCT Pub. No.: WO2011/114448
PCT Pub. Date: Sep. 22, 2011

(65) Prior Publication Data
US 2012/0085092 A1 Apr. 12, 2012

(51) Int. Cl.
*F02D 23/00* (2006.01)
*F02B 37/18* (2006.01)
(Continued)

(52) U.S. Cl.
CPC .......... *F02B 37/186* (2013.01); *F02D 41/0007* (2013.01); *F02D 41/1448* (2013.01); *F15B 21/00* (2013.01); *F02D 41/10* (2013.01); *F02D 41/145* (2013.01); *F02D 41/18* (2013.01); *F02D 2200/0406* (2013.01); *Y02T 10/144* (2013.01)

(58) Field of Classification Search
CPC ...... F02B 37/18; F02B 37/186; F02D 41/007; F02D 41/1448; F02D 2200/0406; F02D 41/04; F02D 41/10; F02D 41/145; F02D 41/18; F15B 21/00

USPC ............. 60/600, 601, 602; 701/102, 103, 104
See application file for complete search history.

(56) References Cited

U.S. PATENT DOCUMENTS 4,424,675 A * 1/1984 Ojima .............................. 60/602
4,697,421 A * 10/1987 Otobe et al. ..................... 60/602
(Continued)

FOREIGN PATENT DOCUMENTS

EP 2314850 A1 4/2011
JP 02-099723 A 4/1990
(Continued)

OTHER PUBLICATIONS

International Search Report mailed Jun. 29, 2010 of PCT/P2009/054498.

*Primary Examiner* — Thai Ba Trieu
*Assistant Examiner* — Jason T Newton
(74) *Attorney, Agent, or Firm* — Kenyon & Kenyon LLP

(57) ABSTRACT

A control apparatus for an internal combustion engine according to the present invention includes: a turbocharger having a turbine disposed in an exhaust path and a compressor disposed in an intake path; a waste gate valve that opens and closes a bypass channel that connects a part of the exhaust path upstream of the turbine and a part of the exhaust path downstream of the turbine to each other; a drive mechanism that drives the waste gate valve; and waste gate valve opening controlling means that controls the drive mechanism so that the opening of the waste gate valve agrees with a saturation minimum opening when the drive mechanism opens the waste gate valve, the saturation minimum opening being the minimum opening at which the flow rate of an exhaust gas passing through the bypass channel is saturated.

3 Claims, 9 Drawing Sheets

(51) Int. Cl.
*F02D 41/00* (2006.01)
*F02D 41/14* (2006.01)
*F15B 21/00* (2006.01)
*F02D 41/10* (2006.01)
*F02D 41/18* (2006.01)

(56) References Cited

U.S. PATENT DOCUMENTS

| | | | | |
|---|---|---|---|---|
| 4,774,812 | A | * | 10/1988 | Hitomi et al. .................... 60/611 |
| 5,063,744 | A | * | 11/1991 | Ishiyama et al. ................. 60/600 |
| 5,289,683 | A | * | 3/1994 | Kurihara ......................... 60/602 |
| 5,551,236 | A | * | 9/1996 | Zimmer et al. .............. 60/605.1 |
| 5,595,163 | A | * | 1/1997 | Nogi et al. ...................... 123/494 |
| 5,605,044 | A | * | 2/1997 | Zimmer et al. ................. 60/602 |
| 5,816,047 | A | * | 10/1998 | Zurlo .............................. 60/602 |
| 6,012,289 | A | * | 1/2000 | Deckard et al. ................ 60/602 |
| 6,076,352 | A | * | 6/2000 | Hayashi .......................... 60/602 |
| 6,151,549 | A | * | 11/2000 | Andrews et al. ............. 701/115 |
| 6,161,384 | A | * | 12/2000 | Reinbold et al. ................ 60/602 |
| 6,360,541 | B2 | * | 3/2002 | Waszkiewicz et al. ...... 60/605.2 |
| 7,047,740 | B2 | * | 5/2006 | Fukasawa et al. .............. 60/602 |
| 7,254,948 | B2 | * | 8/2007 | Gustafson et al. .............. 60/611 |
| 7,478,533 | B2 | * | 1/2009 | Ueno ............................... 60/608 |
| 2003/0121263 | A1 | * | 7/2003 | Hidaka ........................... 60/602 |
| 2004/0216457 | A1 | * | 11/2004 | Shea et al. ...................... 60/608 |
| 2005/0056012 | A1 | * | 3/2005 | Wild et al. ...................... 60/602 |
| 2006/0122762 | A1 | * | 6/2006 | Perkins ........................... 701/102 |
| 2007/0289302 | A1 | * | 12/2007 | Funke et al. .................... 60/602 |
| 2008/0059043 | A1 | * | 3/2008 | Ehlers et al. ................... 701/102 |
| 2009/0165458 | A1 | * | 7/2009 | Matthews ....................... 60/600 |
| 2009/0255517 | A1 | * | 10/2009 | Ishikawa et al. ............. 123/562 |
| 2011/0041493 | A1 | | 2/2011 | Doering et al. |
| 2013/0312406 | A1 | * | 11/2013 | Landsmann .................... 60/602 |

FOREIGN PATENT DOCUMENTS

| | | |
|---|---|---|
| JP | 08-226305 A | 9/1996 |
| JP | 09-100725 A | 4/1997 |
| JP | 2005-291347 A | 10/2005 |
| JP | 2006-274831 A | 10/2006 |

* cited by examiner

CONTROL APPARATUS FOR INTERNAL COMBUSTION ENGINE

CROSS-REFERENCE TO RELATED APPLICATIONS

This is a 371 national phase application of PCT/JP2010/054498 filed 17 Mar. 2010, the contents of which are incorporated herein by reference.

TECHNICAL FIELD

The present invention relates to a control apparatus for an internal combustion engine.

BACKGROUND ART

Many internal combustion engines provided with a turbocharger have a waste gate valve, which opens and closes a bypass channel that connects an upstream part and a downstream part of a turbine to each other. If the supercharging pressure is higher than necessary, there arises a problem that knocking easily occurs. According to the prior art, the waste gate valve is designed to open when the supercharging pressure becomes equal to or higher than a predetermined value, thereby preventing the supercharging pressure from rising beyond the value.

Recently, there have been proposed techniques of actively controlling the opening and closing of the waste gate value with an actuator. For example, according to a technique disclosed in Japanese Patent Laid-Open No. 2006-274831, a fundamental opening of the waste gate valve is calculated from the throttle opening and the engine speed, a correction amount for the opening of the waste gate valve is calculated from the difference between a desired supercharging pressure and an actual supercharging pressure, and the actual opening of the waste gate valve is controlled to be a desired opening of the waste gate valve calculated from the fundamental opening of the waste gate valve and the correction amount for the opening of the waste gate valve.

CITATION LIST

Patent Literature

Patent Literature 1: Japanese Patent Laid-Open No. 2006-274831

SUMMARY OF INVENTION

Technical Problem

With an internal combustion engine in which opening and closing of a waste gate valve can be controlled by an actuator, the waste gate valve can be opened during a steady operation. If the waste gate valve is opened during the steady operation, the back pressure and the pump loss decrease, so that the fuel consumption characteristics can be improved.

However, if the waste gate valve is open in the steady operation, the acceleration response tends to be degraded when an acceleration request occurs. The reason for this is as follows. That is, to raise the supercharging pressure, the waste gate valve has to be closed to raise the turbo rotation speed. However, if an acceleration request occurs when the waste gate valve is open, the start of the rise of the supercharging pressure is delayed by the time required to close the waste gate valve, and the start of acceleration is delayed accordingly.

The present invention has been devised in view of the circumstances described above, and an object of the present invention is to provide a control apparatus for an internal combustion engine that can improve the acceleration response in the case where an acceleration request occurs when a waste gate valve is open.

Solution to Problem

A first invention for achieving the above object is a control apparatus for an internal combustion engine, comprising:

a turbocharger having a turbine disposed in an exhaust path of the internal combustion engine and a compressor disposed in an intake path of the internal combustion engine;

a waste gate valve that opens and closes a bypass channel that connects a part of the exhaust path upstream of the turbine and a part of the exhaust path downstream of the turbine to each other;

a drive mechanism that drives the waste gate valve; and waste gate valve opening controlling means that controls the drive mechanism so that the opening of the waste gate valve agrees with a saturation minimum opening when the drive mechanism opens the waste gate valve, the saturation minimum opening being a minimum opening at which the flow rate of an exhaust gas passing through the bypass channel is saturated.

A second invention is in accordance with the first invention, wherein the waste gate valve opening controlling means includes:

a fundamental opening map that defines a relationship between an operation state of the internal combustion engine and the saturation minimum opening; and drive mechanism controlling means that controls the drive mechanism based on an opening calculated based on the fundamental opening map.

A third invention is in accordance with the first or the second invention, wherein the waste gate valve opening controlling means includes:

turbine downstream pressure acquiring means that detects or estimates a pressure in the part of the exhaust path downstream of the turbine;

turbine upstream pressure acquiring means that detects or estimates a pressure in the part of the exhaust path upstream of the turbine;

saturation minimum opening calculating means that calculates the saturation minimum opening based on a turbine downstream pressure acquired by the turbine downstream pressure acquiring means and a turbine upstream pressure acquired by the turbine upstream pressure acquiring means; and opening correcting means that controls the drive mechanism so as to bring the opening of the waste gate valve close to the opening calculated by the saturation minimum opening calculating means.

A invention is in accordance with any one of the first to the third inventions, comprising biasing means that applies a biasing force to the waist gate valve in the direction to close the waist gate valve, wherein the biasing means is configured to increase the biasing force as the waist gate valve opening increases, and the rate of the increase of the biasing force relative to the increase of the waist gate valve opening is higher when the waist gate valve opening is larger than a predetermined boundary opening than when the waist gate valve opening is smaller than the predetermined boundary opening.

A fifth invention is in accordance with the fourth invention, wherein the boundary opening is set at an opening equal to the minimum waist gate valve opening at which the flow rate of the exhaust gas passing through the bypass channel when the waist gate valve is opened under a predetermined operation state of the internal combustion engine is saturated.

Advantageous Effects of Invention

According to the first invention, when the waste gate valve is opened to improve the fuel consumption characteristics, the waste gate valve can be controlled to be the minimum opening within a range in which the improvement of the fuel consumption characteristics is maximized (saturation minimum opening). As a result, the time required to close the waste gate valve can be reduced. Therefore, the sufficient improvement of the fuel consumption characteristics and the best possible acceleration response in the case where an acceleration request occurs can be achieved at the same time.

According to the second invention, the waste gate valve opening can be controlled to be the saturation minimum opening by a simple method.

According to the third invention, the waste gate valve opening can be more precisely controlled to be the saturation minimum opening.

According to the fourth invention, even when the waste gate valve is wide open, the waste gate valve can be quickly closed when an acceleration request occurs, so that good acceleration response is achieved.

According to the fifth invention, when the waist gate valve is wide open, the waist gate valve can be quickly closed to a minimum opening within a range in which the improvement of the fuel consumption characteristics is maximized.

DESCRIPTION OF EMBODIMENTS

Figure 1:
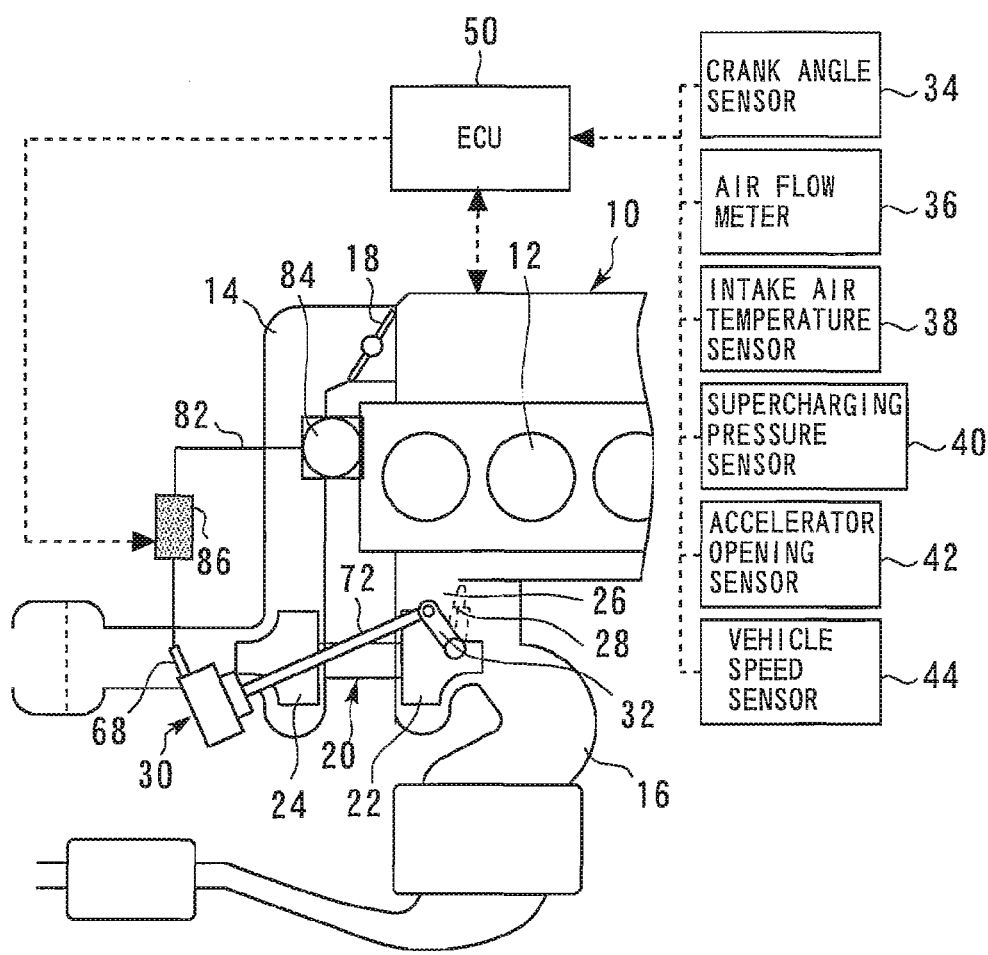
FIG. 1 is a diagram for illustrating a system configuration according to an embodiment 1 of the present invention.

In the following, embodiments of the present invention will be described with reference to the drawings. In the drawings, the same components are denoted by the same reference numerals, and redundant description thereof will be omitted.

Embodiment 1

FIG. 1 is a diagram for illustrating a system configuration according to an embodiment 1 of the present invention. As shown in FIG. 1, a system according to this embodiment has an internal combustion engine 10 (referred to simply as an engine 10 hereinafter) mounted in a vehicle or the like. In each cylinder 12 of the engine 10, a fuel injector, an ignition plug, an intake air valve, an exhaust air valve and the like are provided. The engine 10 further has an intake path 14 through which an intake air is fed into each cylinder 12 and an exhaust path 16 through which an exhaust gas is discharged from each cylinder 12. The intake path 14 is provided with a throttle valve 18 that regulates the amount of intake air.

The engine 10 further has a turbocharger 20 that supercharges the intake air by using the energy of the exhaust gas. The turbocharger 20 has a turbine 22 provided in the exhaust path 16 and a compressor 24 provided in the intake path 14. The turbine 22 is rotated by the pressure of the exhaust gas to drive the compressor 24, and the compressor 24 compresses the intake air.

A bypass channel 26 that connects a part of the exhaust path 16 upstream of the turbine 22 and a part of the exhaust path 16 downstream of the turbine 22 to each other (i.e., provides a bypass between the parts) is provided between the parts. The bypass channel 26 is opened and closed by a waste gate valve 28. The waste gate valve 28 is driven by a diaphragm type actuator 30.

The system according to this embodiment further has a sensor system including the sensors described below and an electronic control unit (ECU) 50 that controls the operation state of the engine 10. A crank angle sensor 34 outputs a signal synchronized with the rotation of a crank shaft of the engine 10. The ECU 50 is capable of detecting the engine speed and the crank angle based on the output of the crank angle sensor 34. An air flow meter 36 detects the amount of fresh air introduced into the intake path 14. An intake air temperature sensor 38 detects the temperature of the intake air. A supercharging pressure sensor 40 detects the pressure at an outlet of the compressor 24 (referred to as a supercharging pressure and denoted by a symbol $P_3$). An accelerator opening sensor 42 detects the amount of operation of an accelerator pedal by a driver of the vehicle (accelerator opening). A vehicle speed sensor 44 detects the speed of the vehicle.

In addition to the sensors described above, the sensor system includes various sensors required for controlling the vehicle or the engine (such as a water temperature sensor that detects the temperature of engine cooling water and an air-fuel ratio sensor that detects the exhaust gas air-fuel ratio), and these sensors are connected to an input side of the ECU 50. Various actuators including the fuel injector and the ignition plug as well as an electrical pump 84 and a pressure regulating valve 86 are connected to an output side of the ECU 50.

The sensor system detects information on the operation of the engine, and the ECU 50 drives the actuators based on the detection result to achieve operation control. More specifically, the ECU 50 detects the engine speed and the crank angle based on the output of the crank angle sensor 34, and the air flow meter 36 detects the amount of intake air. The amount of fuel injection is calculated based on the amount of intake air, the engine speed and the like, and the timing of fuel injection, the timing of ignition and the like are calculated based on the crank angle, and then, the fuel injector and the ignition plug are driven. The ECU 50 also calculates the engine load rate, which is an indicator of the load on the engine 10, based on the engine speed, the amount of intake air and the like.

The electrical pump 84 that serves as a pressure source capable of generating a pressure (positive pressure) is connected to a connection port 68 of the diaphragm type actuator 30 via pressure piping 82. The pressure regulating valve 86 that regulates the pressure applied by the electrical pump 84 to the diaphragm type actuator 30 is connected to a middle part of the pressure piping 82. The pressure regulating valve 86 is formed by an electromagnetically-driven three-way valve, for example, and releases, into the atmosphere, part or the whole of the pressure generated by the electrical pump 84 based on a drive signal input from the ECU 50. In this way, the pressure applied to the diaphragm type actuator 30 can be arbitrarily regulated between a maximum pressure generated by the electrical pump 84 and a value close to the atmospheric pressure.

Figure 2:
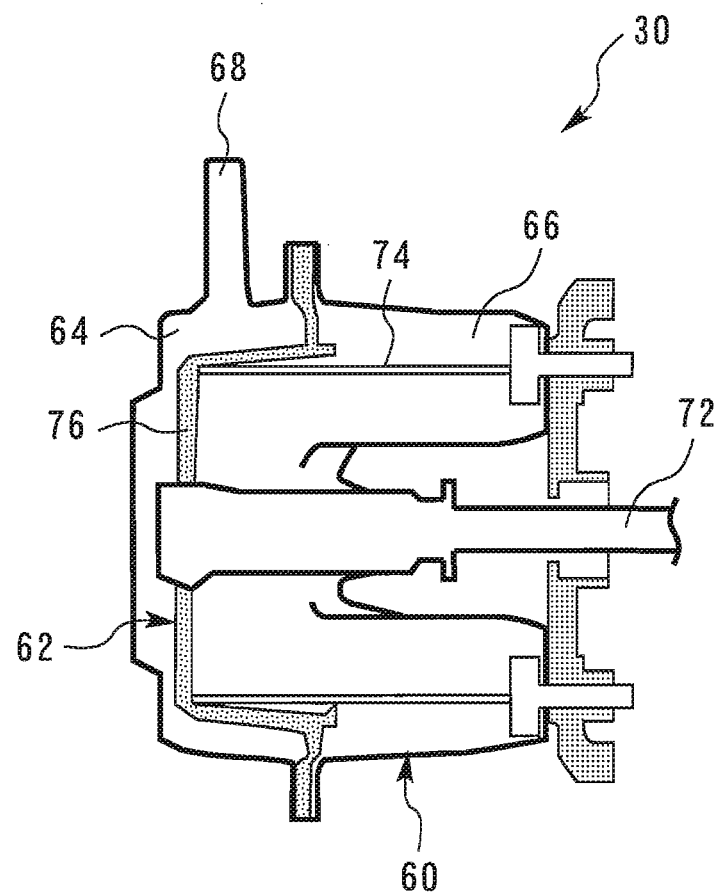
FIG. 2 is a longitudinal cross-sectional view of a diaphragm type actuator.

Next, a configuration of the diaphragm type actuator 30 will be described. FIG. 2 is a longitudinal cross-sectional view of the diaphragm type actuator 30. As shown in FIG. 2, the diaphragm type actuator 30 has a housing 60, a diaphragm 62, a rod 72, and a coil spring 74 serving as a biasing member. The diaphragm 62 is made of a flexible material, such as rubber and resin, and is disposed in the housing 60. The diaphragm 62 is fixed to the inner perimeter of the housing 60 at the outer perimeter thereof. The inner space of the housing 60 is partitioned by the diaphragm 62 into a high pressure chamber 64 and a low pressure chamber 66. The two pressure chambers are disposed on one side and the other side of the diaphragm 62. The housing 60 has the connection port 68, which is in communication with the high pressure chamber 64. As described above, the connection port 68 is connected to the electrical pump 84. Therefore, the pressure generated by the electrical pump 84 and regulated by the pressure regulating valve 86 is introduced into the high pressure chamber 64. On the other hand, the interior of the low pressure chamber 66 is kept at the atmospheric pressure. The rod 72 is fixed to a middle part of the diaphragm 62 in the housing 60 at a base end part thereof. A tip end part of the rod 72 protrudes to the outside from the housing 60 and is connected to the waste gate valve 28 via a link 32 shown in FIG. 1. The coil spring 74 is disposed in the low pressure chamber 66 in a compressed state. The coil spring 74 constantly biases the diaphragm 62 toward the high pressure chamber 64.

Figure 3:
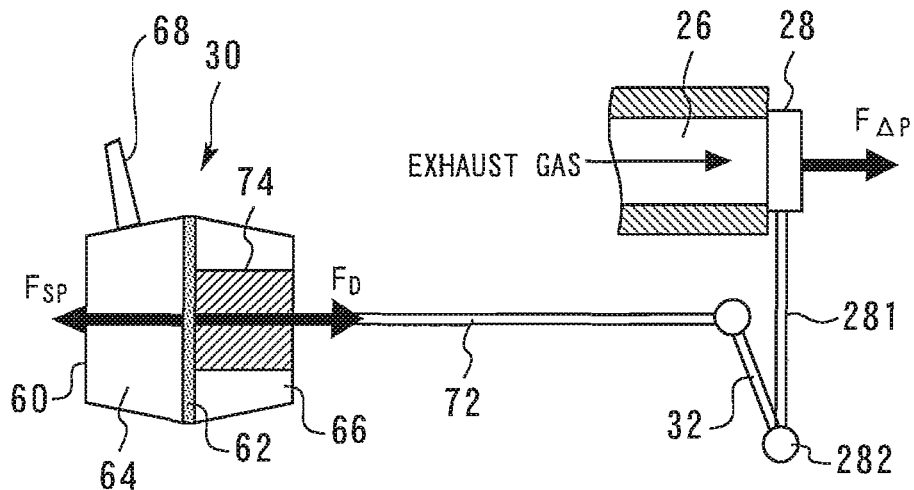
FIG. 3 is a schematic diagram showing a waste gate valve and a diaphragm type actuator of the positive pressure type.

FIG. 3 is a schematic diagram showing the waste gate valve 28 and the diaphragm type actuator 30. As shown in FIG. 3, the waste gate valve 28 opens and closes the outlet of the bypass channel 26 that connects the upstream side and the downstream side of the turbine 22 to each other. The waste gate valve 28 is configured to open from the upstream side toward the downstream side. FIG. 3 shows a state where the outlet of the bypass channel 26 is closed by the waste gate valve 28, that is, a fully closed state. An arm 281 of the waste gate valve 28 is fixed to a rotating shaft 282. The link 32 is also fixed to the rotating shaft 282. Configured in this way, the waste gate valve 28 and the link 32 integrally rotate on the rotating shaft 282. In the fully closed state shown in FIG. 3, if the rod 72 is displaced rightward in FIG. 3, the waste gate valve 28 opens.

The distance of the axial displacement of the rod 72 (referred to as the amount of displacement of the rod 72 hereinafter) corresponds to the angle of opening of the waste gate valve 28. Therefore, the amount of displacement of the rod 72 can be used as an indicator of the opening of the waste gate valve 28 (referred to as a waste gate valve opening hereinafter). Thus, in the following description, the amount of displacement of the rod 72 will be used as the waste gate valve opening and denoted by a symbol x. In this regard, it is assumed that the position of the rod 72 in the fully closed state shown in FIG. 3 (that is, the waste gate valve opening) is x=0, and the direction in which the waste gate valve 28 opens is the positive direction of x.

That is, the waste gate valve opening x varies between 0, which corresponds to the fully closed state, and a predetermined value (>0), which corresponds to a fully open state (a state where the waste gate valve 28 is opened to a mechanical limit).

Except for the frictional force, three forces act in the direction to open or close the waste gate valve 28: the force applied by the diaphragm 62 caused by the pressure difference between the high pressure chamber 64 and the low pressure chamber 66 (referred to as a diaphragm force hereinafter); the biasing force of the coil spring 74 (referred to as a spring force hereinafter); and the force applied to the waste gate valve 28 itself caused by the difference between the pressure on the upstream side of the turbine 22 and the pressure on the downstream side of the turbine 22 (referred to as a natural opening/closing force hereinafter). In the following description, the forces acting in the direction to open or close the waste gate valve 28 will be expressed as an axial force acting on the rod 72.

Assuming that the diaphragm force acting on the rod 72 is denoted by $F_D$, the gauge pressure acting on the high pressure chamber 64 (referred to as a diaphragm pressure hereinafter) is denoted by $P_D$, and the effective area of the diaphragm 62 is denoted by $S_D$, the diaphragm force $F_D$ can be calculated according to the following formula.

$$F_D = P_D \times S_D \tag{1}$$

Assuming that the spring force acting on the rod 72 is denoted by $F_{SP}$, the spring constant of the coil spring 74 is k, and the amount of compression of the coil spring 74 in the fully closed state is denoted by $w_0$, the spring force $F_{SP}$ can be calculated according to the following formula.

$$F_{SP} = k \times (w_0 + x) \tag{2}$$

Assuming that the natural opening/closing force applied to the waste gate valve 28 converted to the force acting on the rod 72 is denoted by $F_{AP}$, the pressure on the upstream side of the turbine 22 (referred to as a turbine upstream pressure hereinafter) is denoted by $P_4$, the pressure on the downstream side of the turbine 22 (referred to as a turbine downstream pressure hereinafter) is denoted by $P_6$, the flow channel cross-sectional area of the outlet of the bypass channel 26 is denoted by $S_{WGV}$, and the ratio between the effective length of the arm 281 and the effective length of the link 32 is denoted by L, the natural opening/closing force $F_{AP}$ can be calculated according to the following formula.

$$F_{AP} = (P_4 - P_6) \times S_{WGV} \times L \tag{3}$$

The three forces described above act in the directions indicated by the arrows in FIG. 3. Therefore, the resultant force F of the three forces acting on the waste gate valve 28 can be calculated according to the following formula, on the assumption that the direction to open the waste gate valve 28 is positive.

$$F = F_D + F_{AP} - F_{SP} \tag{4}$$

In a state where no pressure is applied to the high pressure chamber 64 by the electrical pump 84, $F_D$=0, and F<0. Therefore, the resultant force acting on the waste gate valve 28 acts in the direction to close, the waste gate valve 28 is in the fully closed state. That is, with the configuration according to this embodiment, when no pressure is applied to the high pressure chamber 64 by the electrical pump 84, the waste gate valve 28 is kept in the fully closed state by the biasing force of the coil spring 74.

As the pressure $P_D$ acting on the high pressure chamber 64 increases, the resultant force F also increases. Then, when the resultant force becomes larger than the static frictional force of the movable parts, the waste gate valve 28 starts opening. However, as the waste gate valve opening x increases, the spring force $F_{SP}$ increases, and therefore the resultant force F decreases. Thus, when the opening reaches a certain value, the waste gate valve 28 stops. That is, the waste gate valve opening x is kept at an opening between the fully closed position and the fully open position (referred to as an intermediate opening hereinafter). In this case, as the pressure $P_D$ acting on the high pressure chamber 64 increases, the intermediate opening at which the waste gate valve 28 stops increases. Then, when the pressure $P_D$ acting on the high pressure chamber 64 further increases beyond a certain value, the waste gate valve 28 enters the fully open state. In this way, the pressure $P_D$ acting on the high pressure chamber 64 and the waste gate valve opening x relate to each other. Therefore, according to this embodiment, the ECU 50 can control the waste gate valve opening x by controlling the pressure $P_D$ acting on the high pressure chamber 64 with the pressure regulating valve 86.

According to this embodiment, the electrical pump 84 and the pressure regulating valve 86 constitute pressure applying means. However, the pressure source that drives the diaphragm type actuator according to the present invention is not limited to the electrical pump 84. As an alternative, a mechanical pump directly driven by the engine 10 or the supercharging pressure on the downstream side of the turbine 22 may be used as the pressure source, for example.

Figure 4:
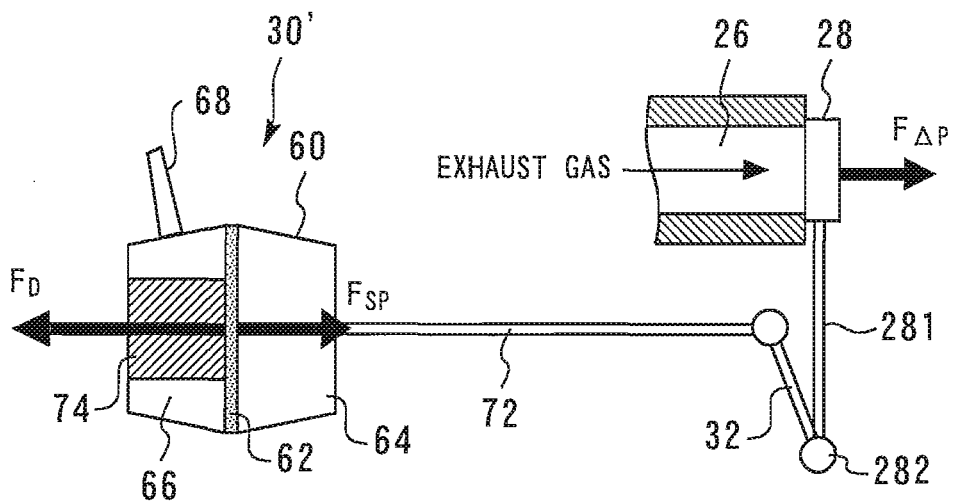
FIG. 4 is a schematic diagram showing a waste gate valve and a diaphragm type actuator of the negative pressure type.

Although the diaphragm type actuator 30 according to this embodiment described above is of the positive pressure type, a diaphragm type actuator of the negative pressure type can also be used according to the present invention. FIG. 4 is a schematic diagram showing a configuration in which a diaphragm type actuator 30' of the negative pressure type is used. In the following, with reference to FIG. 4, the configuration in which the diaphragm type actuator 30' of the negative pressure type is used will be briefly described, focused on differences from the configuration in which the diaphragm type actuator 30 of the positive pressure type is used.

As shown in FIG. 4, the diaphragm type actuator 30' of the negative pressure type differs from the diaphragm type actuator 30 of the positive pressure type in that the high pressure chamber 64 and the low pressure chamber 66 with the coil spring 74 change places with each other with respect to the diaphragm 62. The connection port 68 in communication with the low pressure chamber 66 is connected to a pressure source, such as a negative pressure pump and an intake pipe negative pressure. The interior of the high pressure chamber 64 is kept at the atmospheric pressure. The spring force $F_{SP}$ can be calculated according to the following formula.

$$F_{SP}=k \times (w_0-x) \quad (5)$$

The diaphragm forced $F_D$ and the spring force $F_{SP}$ act in the directions indicated by the arrows in FIG. 4. Therefore, the resultant force F of the three forces acting on the waste gate valve 28 can be calculated according to the following formula, on the assumption that the direction to open the waste gate valve 28 is positive.

$$F=-F_D+F_{\Delta P}+F_{SP} \quad (6)$$

With the diaphragm type actuator 30' of the negative pressure type, in a state where no pressure is applied to the low pressure chamber 66 by the negative pressure source, F>0, and the waste gate valve 28 is open. Then, as the negative pressure acting on the low pressure chamber 66 increases, the waste gate valve opening decreases. Then, once the negative pressure acting on the low pressure chamber 66 increases to be equal or higher than a certain value, the waste gate valve 28 is kept in the fully closed state.

Although the diaphragm type actuators of the positive pressure type and the negative pressure type have been described above, the diaphragm type actuator that can be used in the present invention is not limited to the positive pressure type and the negative pressure type, and any diaphragm type actuator of any type can be used. For example, pressures can be applied to both the high pressure chamber 64 and the low pressure chamber 66 from a pressure source. In the following description, in principle, cases where the diaphragm type actuator 30 of the positive pressure type is used will be described as a representative.

The ECU 50 according to this embodiment performs a control to open the waste gate valve 28 when the engine 10 is in a steady operational state, that is, when the engine speed and the engine load rate are substantially kept constant. Therefore, the back pressure of the engine 10 decreases, and the work of the piston in each cylinder 12 required to push the exhaust gas into the exhaust path 16 (referred to as a discharge loss hereinafter) also decreases, so that the fuel consumption characteristics can be improved. In the following description, the flow rate of the exhaust gas passing through the bypass channel 26 when the waste gate valve 28 is open will be referred to as a bypass flow rate.

Figure 5:
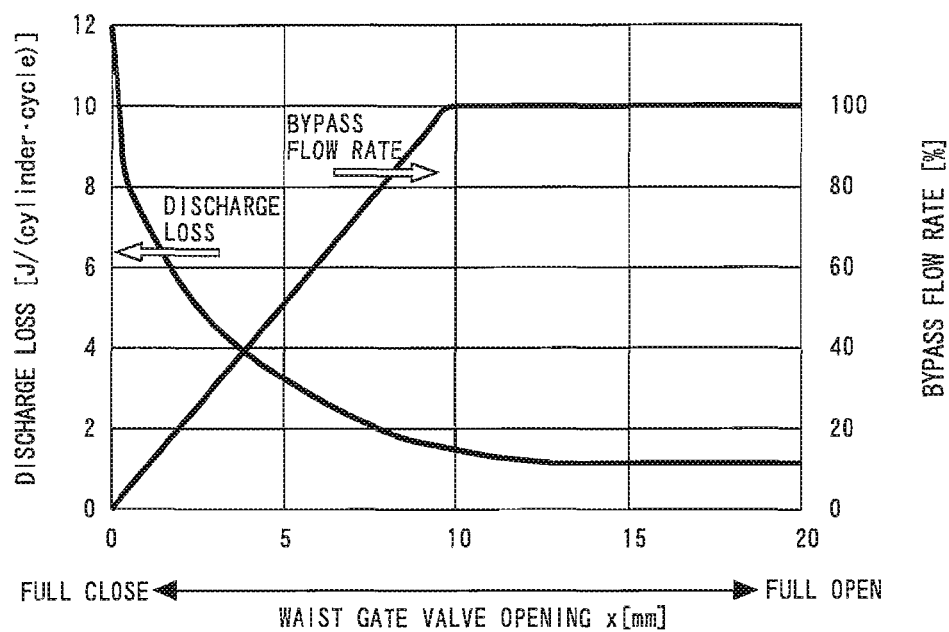
FIG. 5 is a graph showing the relationship between a bypass flow rate and discharge loss and a waste gate valve opening.

The inventors have studied the relationship between the bypass flow rate and discharge loss and the waste gate valve opening in the case where the waste gate valve 28 is opened by the control described above. FIG. 5 is a graph showing the relationship described above at a certain engine speed and a certain load factor. In FIG. 5, the bypass flow rate is expressed in percentage relative to the bypass flow rate in the case where the waste gate valve 28 is fully open.

As shown in FIG. 5, as the waste gate valve opening gradually increases from the fully closed position, the bypass flow rate increases, and the discharge loss decreases. However, when the waste gate valve opening reaches a particular intermediate opening, the bypass flow rate becomes saturated. That is, even if the waste gate valve opening further increases, the bypass flow rate does not further increase. In the following description, the intermediate opening having the above described characteristics (that is, the minimum waste gate valve opening at which the bypass flow rate becomes saturated) will be referred to as a saturation minimum opening.

As can be seen from FIG. 5, the discharge loss, which decreases as the waste gate valve opening gradually increases from the fully closed position, is substantially at the minimum when the waste gate valve opening reaches the saturation minimum opening. And even if the waste gate valve opening increases beyond the saturation minimum opening, the discharge loss does not further decrease. If the discharge loss does not further decrease, the fuel consumption characteristics are not further improved. Therefore, it can be considered that the improvement of the fuel consumption characteristics is also saturated when the waste gate valve opening reaches the saturation minimum opening. That is, it can be determined that the fuel consumption characteristics are not further improved even if the waste gate valve opening increases beyond the saturation minimum opening.

From the viewpoint of the acceleration response in the case where an acceleration request occurs when the waste gate valve 28 is open, the waste gate valve opening is preferably as small as possible. This is because, when an acceleration request occurs, the smaller the waste gate valve opening, the shorter the time required to close the waste gate valve 28, and therefore, the supercharging pressure can be raised more quickly, and the acceleration can be started earlier.

From the above description, it can be concluded that the waste gate valve opening is desirably held at the saturation minimum opening in order to achieve the best possible acceleration response when an acceleration request occurs, while advantageously maximizing the improvement of the fuel consumption characteristics, which is provided by opening the waste gate valve 28. Thus, according to this embodiment, the operation of the diaphragm type actuator 30 is controlled so that the waste gate valve opening is equal to the saturation minimum opening when the waste gate valve 28 is opened. The saturation minimum opening varies depending on the engine operation state (the engine speed and the engine load rate). Therefore, in this control, the waste gate valve opening has to be controlled to be the saturation minimum opening suitable for the operation state. To this end, according to this embodiment, the relationship between the engine operation state and the saturation minimum opening is previously studied to produce a map that prescribes the relationship, and the map is previously stored in the ECU 50. The map that prescribes the relationship between the engine operation state and the saturation minimum opening will be referred to as a fundamental opening map hereinafter. In producing the fundamental opening map, the saturation minimum opening can be determined as described below.

Assuming that the bypass flow rate is denoted by $m_b$, the opening area of the outlet of the bypass channel 26 opened and closed by the waste gate valve 28 (referred to as a waste gate opening area hereinafter) is denoted by $A_{WGV}$, the flow rate coefficient is denoted by $\mu$, the gas constant is denoted by R, the temperature of the upstream side of the turbine 22 (referred to as a turbine upstream temperature hereinafter) is denoted by $T_4$, and the ratio of specific heat is denoted by K, the bypass flow rate $m_b$ can be calculated according to the following formula (7). $\Phi(P_4/P_6)$ in the formula (7) is defined by the following formula (8).

[formula 1]

$$m_b = \mu \cdot A_{WGV} \cdot \frac{P_4}{\sqrt{R \cdot T_4}} \cdot \Phi\left(\frac{P_4}{P_6}\right) \quad (7)$$

$$\Phi\left(\frac{P_4}{P_6}\right) = \sqrt{\frac{\kappa}{2(\kappa+1)}} \qquad \frac{P_6}{P_4} \leq \frac{1}{\kappa+1}$$

$$= \sqrt{\left\{\frac{\kappa-1}{2\kappa}\left(1-\frac{P_6}{P_4}\right)+\frac{P_6}{P_4}\right\}\left(1-\frac{P_6}{P_4}\right)} \quad \frac{P_6}{P_4} > \frac{1}{\kappa+1} \quad (8)$$

In the above formula (7), the flow rate coefficient $\mu$ and the waste gate opening area $A_{WGV}$ are values that depend on the waste gate valve opening x. The waste gate opening area $A_{WGV}$ will be described with reference to FIG. 6.

Figure 6:
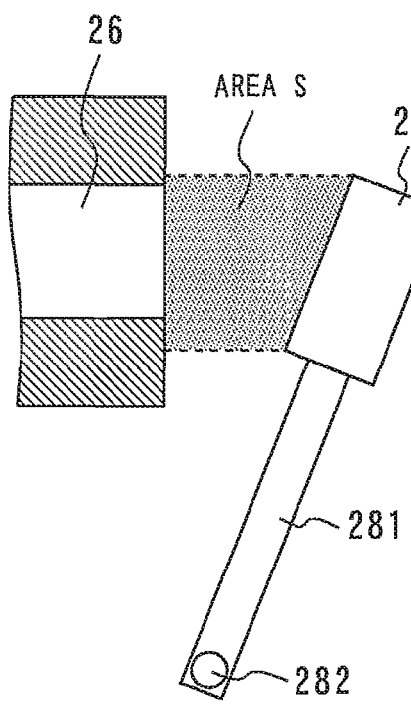
FIG. 6 is a diagram for illustrating a waste gate opening area.

FIG. 6 is a diagram for illustrating the waste gate opening area $A_{WGV}$. As shown in FIG. 6, it is assumed that there is a cylindrical pipe having the same diameter as the waste gate valve 28 between the end face of the waste gate valve 28 intended to come into contact with the outlet of the bypass channel 26 and the end face of the outlet of the bypass channel 26 (shown by the shaded part in FIG. 6). The area of the outer periphery of the cylinder is denoted by S. The area S can be geometrically calculated according to the waste gate valve opening x. If the area S is smaller than the flow channel cross-sectional area $S_{WGV}$ of the outlet of the bypass channel 26, the effective opening area formed in the gap between the outlet of the bypass channel 26 and the waste gate valve 28 is limited by the area S. On the other hand, if the area S is equal to or larger than the flow channel cross-sectional area $S_{WGV}$ of the outlet of the bypass channel 26, the effective opening area at the outlet of the bypass channel 26 is limited by the flow channel cross-sectional area $S_{WGV}$. Therefore, the waste gate opening area $A_{WGV}$ is equal to the smaller one of the area S that varies depending on the waste gate valve opening x and the fixed value $S_{WGV}$. In this way, the waste gate opening area $A_{WGV}$ can be calculated according to the waste gate valve opening x.

As described above, according to the formulas (7) and (8), the bypass flow rate $m_b$ can be calculated based on the waste gate valve opening x, the turbine upstream pressure $P_4$, the turbine upstream temperature $T_4$ and the turbine downstream pressure $P_6$. Thus, the waste gate valve opening x is increased stepwise from the fully closed position, the turbine upstream pressure $P_4$, the turbine downstream pressure $P_6$ and the turbine upstream temperature $T_4$ are measured in each step, and the measurements are substituted into the formulas (7) and (8) to determine the bypass flow rate $m_b$ in each step. In this way, the minimum waste gate valve opening at which the bypass flow rate $m_b$ is saturated, that is, the saturation minimum opening can be determined. Such an experimental operation is performed at different points of the engine operation state to grasp the relationship between the engine operation state and the saturation minimum opening, and the fundamental opening map can be produced based on the relationship. In the experimental operation described above, the turbine upstream pressure $P_4$ and the turbine downstream pressure $P_6$ may not be directly measured but estimated in the manner described below.

The ECU 50 can check the engine speed and the engine load rate detected by the sensor system described above against the fundamental opening map, thereby determining the saturation minimum opening in the current engine operation state. In this embodiment, the ECU 50 stores a map used for calculating the diaphragm pressure required to make the waste gate valve opening x agree with a given opening (referred to as a diaphragm pressure map hereinafter). The ECU 50 calculates based on the diaphragm pressure map the diaphragm pressure required to make the waste gate valve opening agree with the saturation minimum opening calculated based on the fundamental opening map, and controls the pressure regulating valve 86 so as to achieve the calculated diaphragm pressure. In this way, the actual waste gate valve opening can be precisely kept at the saturation minimum opening. As a result, the improvement of the fuel consumption characteristics provided by opening the waste gate valve 28 can be advantageously maximized, while achieving good acceleration response in the case where an acceleration request occurs.

Furthermore, according to this embodiment, a feedback control to make the waste gate valve opening more precisely agree with the saturation minimum opening may be performed as described below. In the feedback control, the ECU 50 estimates the turbine upstream temperature $T_4$ and the turbine downstream pressure $P_6$, and substitutes the estimated values into the formulas (7) and (8) to calculate the saturation minimum opening. The ECU 50 previously stores the map that defines the relationship between the waste gate valve opening x and the flow rate coefficient μ, and the map that defines the relationship between the waste gate valve opening x and the waste gate opening area $A_{WGV}$. In addition, the ECU 50 previously stores a map used for calculating the turbine upstream temperature $T_4$ based on the engine speed and the engine load rate. Using these maps, the ECU 50 can calculate the flow rate coefficient μ, the waste gate opening area $A_{WGV}$, and the turbine upstream temperature $T_4$, thereby calculating the formulas (7) and (8).

Figure 7:
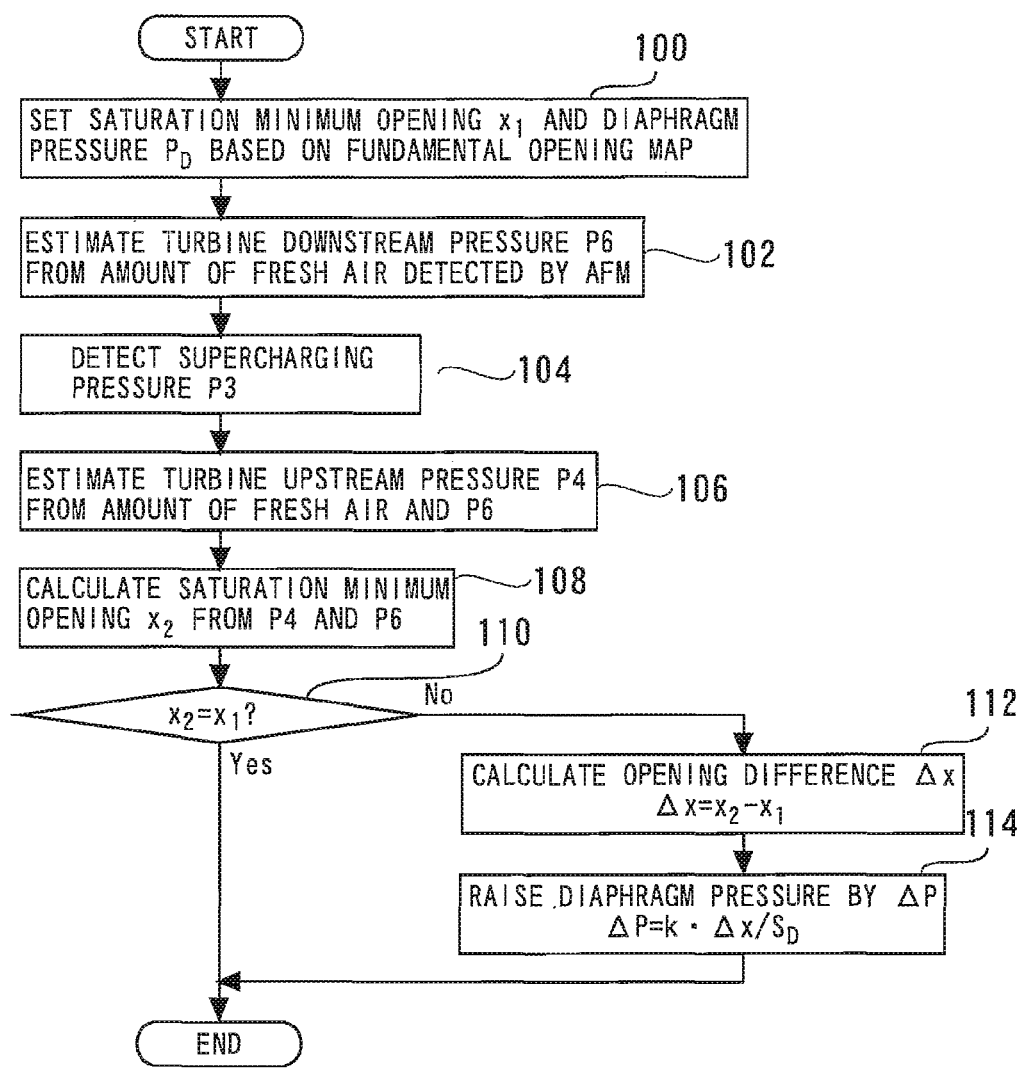
FIG. 7 is a flowchart illustrating a routine that is executed by the embodiment 1 of the present invention.

FIG. 7 is a flowchart showing a routine performed by the ECU 50 to perform the feedback control of the waste gate valve opening according to this embodiment. The routine is repeatedly performed every predetermined time.

According to the routine shown in FIG. 7, first, a control to make the actual waste gate valve opening agree with the saturation minimum opening calculated from the fundamental opening map, or in other words a feed forward-like control is performed as described below (Step 100). First, the saturation minimum opening is calculated by checking the current engine speed and the current engine load rate against the fundamental opening map. The calculated saturation minimum opening is denoted by $x_1$. Then, the diaphragm pressure $P_D$ required to make the actual waste gate valve opening agree with the saturation minimum opening $x_1$ is calculated, and the calculated diaphragm pressure $P_D$ is set by controlling the pressure regulating valve 86. In this way, the actual waste gate valve opening is controlled to be the saturation minimum opening $x_1$ calculated based on the fundamental opening map.

Figure 8:
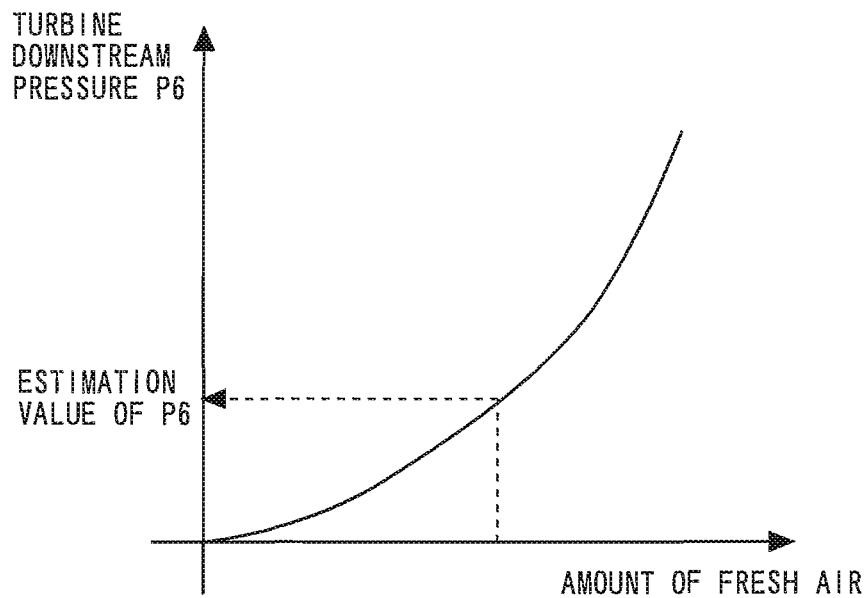
FIG. 8 is a map showing a relationship between an amount of fresh air and a turbine downstream pressure.

Then, based on the amount of fresh air detected by the air flow meter 36, the turbine downstream pressure $P_6$ is estimated (Step 102). FIG. 8 is a map showing a relationship between the amount of fresh air and the turbine downstream pressure $P_6$. The ECU 50 previously stores a map like the one shown in FIG. 8. In Step 102, based on the map, an estimation value of the turbine downstream pressure $P_6$ can be calculated.

Figure 9:
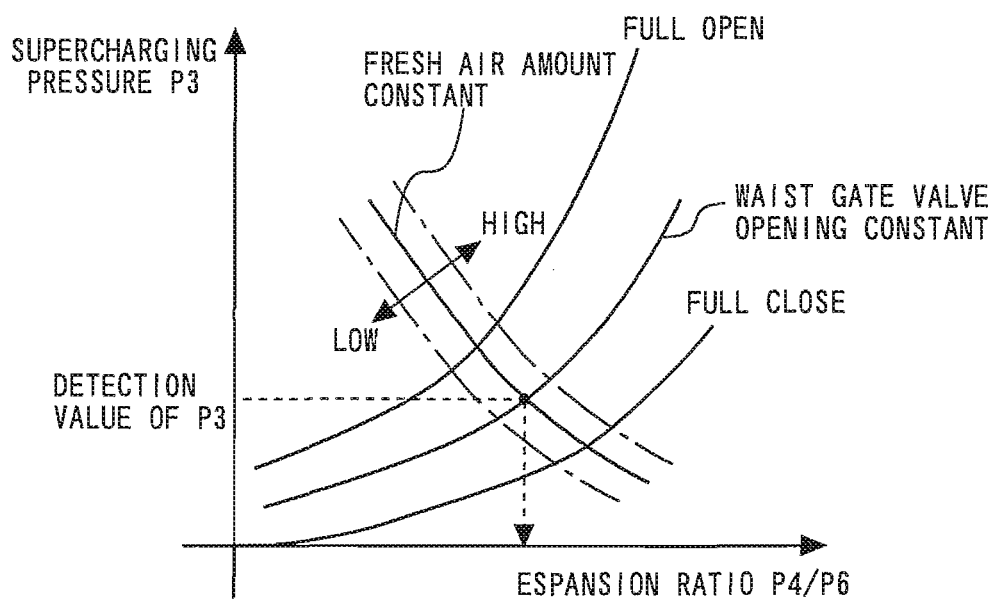
FIG. 9 is a map showing a relationship between an expansion ratio and a supercharging pressure.

Then, the supercharging pressure sensor 40 detects the supercharging pressure $P_3$ (Step 104). Then, based on the detected supercharging pressure $P_3$, the amount of fresh air and the turbine downstream pressure $P_6$, the turbine upstream pressure $P_4$ is estimated as described below (Step 106). FIG. 9 is a map showing a relationship between an expansion ratio $P_4/P_6$ and the supercharging pressure $P_3$. The ECU 50 previously stores a map like the one shown in FIG. 9. If the amount of fresh air is fixed, the relationship between the expansion ratio $P_4/P_6$ and the supercharging pressure $P_3$ is represented by a downward sloping curve in FIG. 9. In FIG. 9, the curve moves to the upper right as the amount of fresh air increases and moves to the lower left as the amount of fresh air decreases. The downward sloping curve in FIG. 9 can be uniquely determined by using the amount of fresh air detected by the air flow meter 36. Therefore, it can be determined that the intersection of the determined downward sloping curve and the horizontal straight line that represents the value of the supercharging pressure $P_3$ detected by the supercharging pressure sensor 40 indicates the current state. Thus, the current expansion ratio $P_4/P_6$ can be determined. The estimation value of the turbine upstream pressure $P_4$ can be calculated by dividing the estimation value of the turbine downstream pressure $P_6$ calculated in Step 102 by the determined value of the expansion ratio $P_4/P_6$.

The method of estimating the turbine upstream pressure $P_4$ is not limited to the method described above, but the turbine upstream pressure $P_4$ can also be estimated as described below. If the waste gate valve opening is fixed, the relationship between the expansion ratio $P_4/P_6$ and the supercharging pressure $P_3$ is represented by an upward sloping curve in FIG. 9. In FIG. 9, the curve moves upward as the waste gate valve opening increases and moves downward as the waste gate valve opening decreases. The waste gate valve opening is controlled to be $x_1$ by the processing of Step 100 and therefore known. Thus, based on the value $x_1$, the upward sloping curve in FIG. 9 can be uniquely determined. Then, it can be determined that the intersection of the determined upward sloping curve and the downward sloping curve determined from the amount of fresh air indicates the current state. Then, the estimation value of the turbine upstream pressure $P_4$ can be calculated in the same manner as described above. In the case where this method is used, the turbine upstream pressure $P_4$ can be estimated without using the detection value of the supercharging pressure $P_3$.

Following the processing of Step 106 described above, a processing of calculating the saturation minimum opening is performed by calculating the formulas (7) and (8) by substituting the estimation value of the turbine downstream pressure $P_6$ calculated in Step 102 and the estimation value of the turbine upstream pressure $P_4$ calculated in Step 106 into the formulas (7) and (8) (Step 108). Specifically, in Step 108, the bypass flow rate $m_b$ is repeatedly calculated by changing the value of the waste gate valve opening x to search for the minimum value of the waste gate valve opening x at which the bypass flow rate $m_b$ is saturated, thereby calculating the saturation minimum opening. The saturation minimum opening calculated in this step is denoted by $x_2$.

The saturation minimum opening $x_2$ calculated in Step 108 is calculated based on the estimation values of the current turbine upstream pressure $P_4$ and the turbine downstream pressure $P_6$, and therefore, can be considered to be more precise than the saturation minimum opening $x_1$ calculated from the fundamental opening map in a feed forward manner in Step 100. Thus, in the processings in Step 110 and the following steps of the routine shown in FIG. 7, if there is a difference between the saturation minimum opening $x_2$ and the saturation minimum opening $x_1$, which is the current actual waste gate valve opening, the diaphragm pressure is corrected to make the actual waste gate valve opening agree with the more precise saturation minimum opening $x_2$.

More specifically, first, it is determined whether or not the saturation minimum opening $x_2$ and the saturation minimum opening $x_1$ agree with each other (Step 110). If the saturation minimum opening $x_2$ and the saturation minimum opening $x_1$ agree with each other, it means that the current actual waste gate valve opening agrees with the saturation minimum opening $x_2$, and therefore, correction of the diaphragm pressure is not required. In this case, the routine ends at this step.

However, if it is determined that the saturation minimum opening $x_2$ and the saturation minimum opening $x_1$ do not agree with each other in Step 110, the difference $\Delta x(=x_2-x_1)$ between the saturation minimum opening $x_2$, which is the desired opening, and the saturation minimum opening $x_1$, which is the current opening, is calculated (Step 112). If the waste gate valve opening changes by $\Delta x$, the spring force $F_{SP}$ increases by $k \times \Delta x$. Therefore, to change the waste gate valve opening by $\Delta x$, the diaphragm pressure can be increased by an increment equivalent to the increment $k \times \Delta x$ of the spring force $F_{SP}$. Therefore, assuming that the required increment of the diaphragm pressure is denoted by $\Delta P$, the following formulas hold.

$$\Delta P \times S_D = k \times \Delta x \quad (9)$$

$$\Delta P = k \times \Delta x / S_D \quad (10)$$

Thus, following the processing of Step 112, a processing of increasing the diaphragm pressure by ΔP calculated according to the formula (10) is performed by controlling the pressure regulating valve 86 (if ΔP<0, the pressure is decreased) (Step 114). In this way, the actual waste gate valve opening can be made to agree with (or brought close to) the saturation minimum opening $x_2$, which is the desired opening.

By the control according to the routine shown in FIG. 7 described above, the saturation minimum opening, which depends on the operation state of the engine 10, can be precisely determined, and the diaphragm type actuator 30 can be driven so as to bring the actual waste gate valve opening close to the precise saturation minimum opening. As a result, the maximization of the improvement of the fuel consumption characteristics provided by opening the waste gate valve 28 and the best possible acceleration response in the case where an acceleration request occurs can be achieved at the same time with higher reliability.

In the embodiment 1 described above, the electrical pump 84, the pressure regulating valve 86 and the diaphragm type actuator 30 correspond to the "drive mechanism" according to the first invention. The ECU 50 implements the "waste gate valve opening controlling means" according to the first invention by performing the process of the routine shown in FIG. 7, implements the "drive mechanism controlling means" according to the second invention by performing the processing of Step 100, implements the "turbine downstream pressure acquiring means" according to the third invention by performing the processing of Step 102, implements the "turbine upstream pressure acquiring means" according to the third invention by performing the processing of Step 106, implements the "saturation minimum opening calculating means" according to the third invention by performing the processing of Step 108, and implements the "opening correcting means" according to the third invention by performing the processings of Steps 112 and 114.

Although an example where the diaphragm type actuator is used to drive the waste gate valve has been described in this embodiment, the drive mechanism for the waste gate valve according to the present invention is not limited to the mechanism using the diaphragm type actuator, and a drive mechanism using an electrical motor may be used, for example.

Embodiment 2

Next, an embodiment 2 of the present invention will be described with reference to FIG. 10. The description will be focused mainly on differences from the embodiment 1 described above, and description of commonalities with the embodiment 1 will be simplified or omitted. The hardware configuration according to this embodiment is the same as that according to the embodiment 1, and thus, description thereof will be omitted.

In the case where the diaphragm type actuator 30 of the positive pressure type is used, when the waste gate valve 28 is open, a positive pressure is applied from the positive pressure source to the diaphragm type actuator 30. To close the waste gate valve 28 in this state, the positive pressure has to be released to decrease the diaphragm pressure. The higher the positive pressure acting in the state where the waste gate valve 28 is open, the longer the time required to reduce the diaphragm pressure to the value at which the waste gate valve 28 closes. Therefore, in order to close the waste gate valve 28 as quickly as possible, the diaphragm pressure (positive pressure) acting in the state where the waste gate valve 28 is open is desirably as low as possible. In other words, applying a diaphragm pressure higher than necessary in the state where the waste gate valve 28 is open is not preferable because it elongates the time required to close the waste gate valve 28. From these facts, it can be said that, in order to minimize the time required to close the waste gate valve 28, a minimum pressure required to maintain the opening preferably acts on the diaphragm 62.

In the case where the diaphragm type actuator 30 of the positive pressure is used, the resultant force F of the three forces acting on the waste gate valve 28 is expressed by the formula (4) described above. If the resultant force F is zero when the waste gate valve 28 is open, it means that the waste gate valve 28 is kept open by the minimum required diaphragm pressure, which is the desired state described above. Thus, in this embodiment, the diaphragm pressure is controlled so as to bring the resultant force F acting on the waste gate valve 28 as close to zero as possible when the waste gate valve 28 is open.

The fact that the waste gate valve 28 can be closed more quickly if the resultant force F acting on the waste gate valve 28 is zero when the waste gate valve 28 is open holds true in the case where the diaphragm type actuator 30' of the negative pressure type is used. In the case where the diaphragm type actuator 30' of the negative pressure type is used, the waste gate valve 28 is open when no negative pressure is applied from the negative pressure source. To close the waste gate valve 28 in this state, the negative pressure from the negative pressure source has to be applied to the diaphragm 62 to reduce the diaphragm pressure to a predetermined value or lower. In this case, the larger the variation of the diaphragm pressure required to close the waste gate valve 28, the longer the time required to close the waste gate valve 28. If no negative pressure acts on the diaphragm 62 when the waste gate valve 28 is open, the variation of the diaphragm pressure required to close the waste gate valve 28 is large, and therefore, the time required to close the waste gate valve 28 is long. However, if some negative pressure acts on the diaphragm 62 from the beginning when the waste gate valve 28 is open, a smaller variation of the diaphragm pressure is required to close the waste gate valve 28, and therefore, the time required to close the waste gate valve 28 can be reduced. Therefore, it can be said that, in order to minimize the time required to close the waste gate valve 28, a minimum negative pressure required to maintain the opening of the waste gate valve 28 is desirably previously applied to the diaphragm 62 when the waste gate valve 28 is open.

In the case where the diaphragm type actuator 30' of the negative pressure is used, the resultant force F of the three forces acting on the waste gate valve 28 is expressed by the formula (6) described above. If the resultant force F is zero when the waste gate valve 28 is open, it means that a minimum negative pressure required to prevent the waste gate valve 28 from being closed acts on the diaphragm 62, which is the desired state described above. As can be seen from the above description, in the case where the diaphragm type actuator 30' of the negative pressure type is used, the time required to close the waste gate valve 28 can be minimized by controlling the diaphragm pressure so as to bring the resultant force F acting on the waste gate valve 28 when the waste gate valve 28 is open close to zero.

Figure 10:
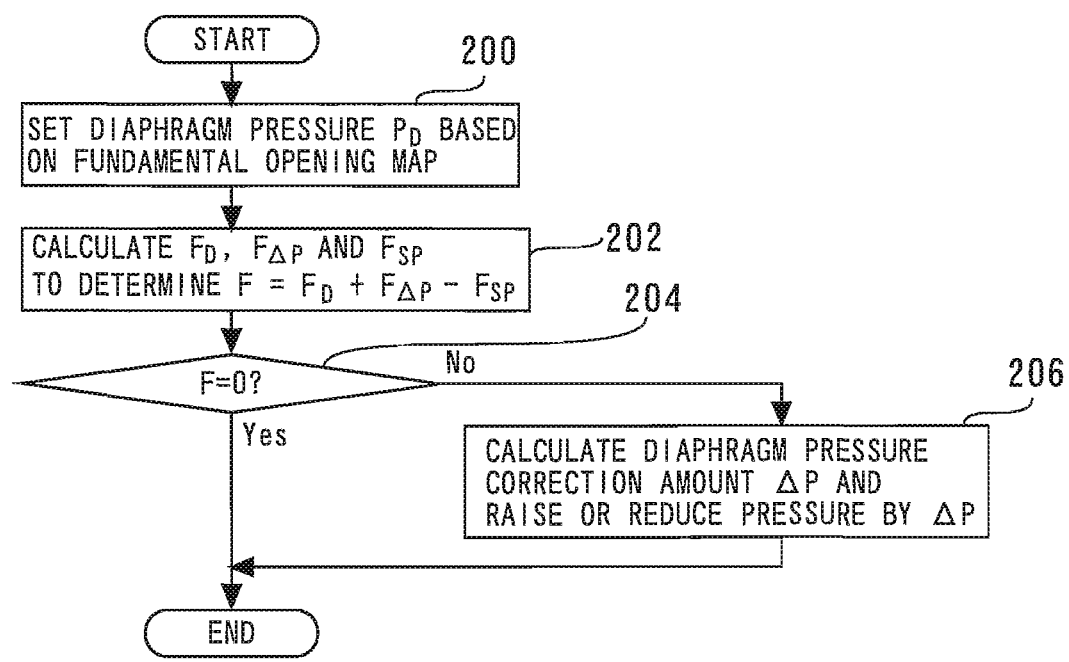
FIG. 10 is a flowchart illustrating a routine that is executed by an embodiment 2 of the present invention.

FIG. 10 is a flowchart showing a routine performed by the ECU 50 to perform the functions described above according to this embodiment. According to the routine shown in FIG. 10, first, a control to make the actual waste gate valve opening agree with the opening calculated from the fundamental opening map as described below (Step 200). First, a fundamental waste gate valve opening is calculated by checking the current engine speed and the current engine load rate against the fundamental opening map. The fundamental opening map according to this embodiment may be the same saturation minimum opening map according to the embodiment 1 or may be a map of opening determined independently of the saturation minimum opening. Once the fundamental waste gate valve opening is calculated, the diaphragm pressure $P_D$ required to make the actual waste gate valve opening agree with the fundamental waste gate valve opening is calculated based on the diaphragm pressure map. Then, the actual diaphragm pressure is controlled so as to agree with the calculated diaphragm pressure $P_D$ by controlling the pressure regulating valve 86. In this way, the actual waste gate valve opening is controlled to be the fundamental waste gate valve opening calculated based on the fundamental opening map.

Then, a processing of calculating the resultant force F acting on the waste gate valve 28 is performed (Step 202). Specifically, the diaphragm force $F_D$, the spring force $F_{SP}$ and the natural opening/closing force $F_{AP}$ are calculated according to the formulas described above, and the resultant force F is calculated based on these forces. The values of the turbine upstream pressure $P_4$ and the turbine downstream pressure $P_6$ required for calculating the natural opening/closing force $F_{AP}$ can be estimated by the method described above with regard to the embodiment 1.

Then, it is determined whether or not the resultant force F calculated in Step 202 is zero (Step 204). If it is determined that the resultant force F is zero in Step 204, the goal is already attained, and therefore, this routine ends at this step. However, if the resultant force F is not zero, a processing of correcting the diaphragm pressure to bring the resultant force F to zero is performed (Step 206). Specifically, the following processing is performed.

Assuming that the required correction amount of the diaphragm pressure is denoted by $\Delta P$, the corrected diaphragm pressure can be expressed as $(P_D+\Delta P) \times S_D$. The required correction amount $\Delta P$ of the diaphragm pressure can be calculated by solving an equation that represents the resultant force F calculated based on the corrected diaphragm pressure $(P_D+\Delta P) \times S_D$, the spring force $F_{SP}$ and the natural opening/closing force $F_{AP}$ is equal to zero. Then, a control to increase or decrease the diaphragm pressure by the calculated $\Delta P$ with the pressure regulating valve 86 is performed. In this way, the resultant force F acting on the waste gate valve 28 can be brought close to zero as quickly as possible.

By the control according to the routine shown in FIG. 10 described above, the resultant force F acting on the waste gate valve 28 when the waste gate valve 28 is open can be brought close to zero as quickly as possible. As a result, the variation of the diaphragm pressure required to close the waste gate valve 28 can be reduced as quickly as possible. As a result, the waste gate valve 28 can be quickly closed when an acceleration request occurs and the waste gate valve 28 has to be closed, and thus, the acceleration response can be improved.

Embodiment 3

Next, an embodiment 3 of the present invention will be described with reference to FIGS. 11 and 12. The description will be focused mainly on differences from the embodiments described above, and description of commonalities with the embodiments will be simplified or omitted. The hardware configuration according to this embodiment is the same as that according to the embodiments in other respects than described below, and thus, description thereof will be omitted. The embodiment 3 described below is a combination of the embodiments 1 and 2 described above.

Figure 11:
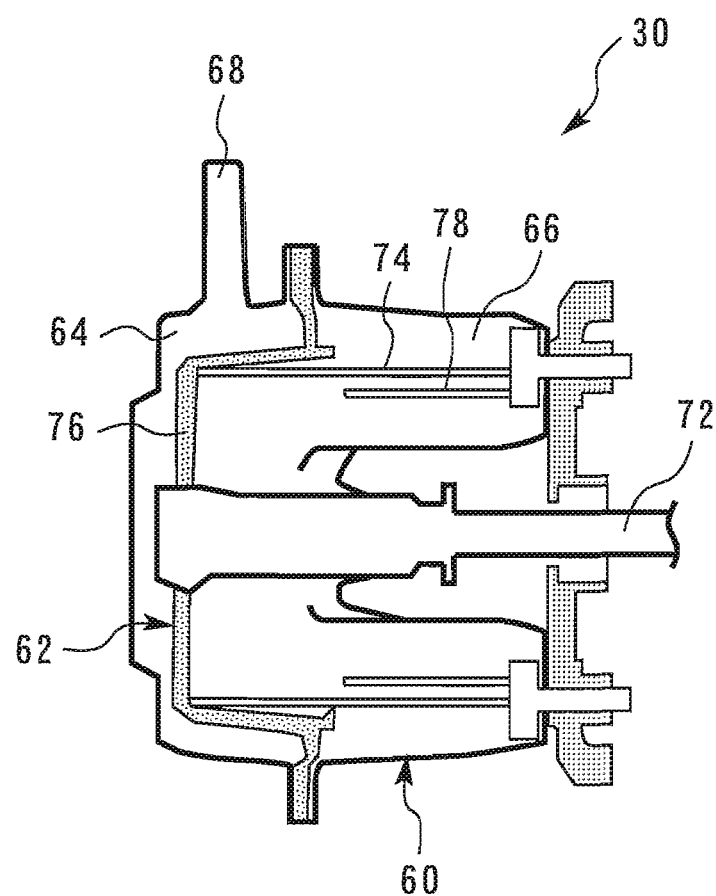
FIG. 11 is a longitudinal cross-sectional view of a diaphragm type actuator according to an embodiment 3 of the present invention.

FIG. 11 is a longitudinal cross-sectional view of a diaphragm type actuator according to the embodiment 3 of the present invention. As shown in FIG. 11, in the low pressure chamber 66 of the diaphragm type actuator 30 according to this embodiment, a second coil spring 78 is disposed in addition to a first coil spring 74. The first coil spring 74 and the second coil spring 78 push the diaphragm 62 toward the high pressure chamber 64, thereby applying a biasing force to the waste gate valve 28 in a direction to close the waste gate valve 28. However, the second coil spring 78 is shorter than the first coil spring 74, and therefore, does not come into contact with the diaphragm 62 and apply any biasing force if the waste gate valve opening is smaller than a predetermined opening (referred to as a boundary opening and denoted by a symbol $x_b$ hereinafter). That is, only the first coil spring 74 applies the biasing force if the waste gate valve opening is smaller than the boundary opening $x_b$, and both the first coil spring 74 and the second coil spring 78 apply the biasing force if the waste gate valve opening is larger than the boundary opening $x_b$. Therefore, the spring constant of the biasing force (spring force $F_{SP}$) acting on the waste gate valve 28 is higher when the waste gate valve opening is larger than the boundary opening $x_b$ than when the waste gate valve opening is smaller than the boundary opening $x_b$. That is, the rate of increase of the biasing force relative to the increase of the waste gate valve opening is higher when the waste gate valve opening is larger than boundary opening $x_b$ than when the waste gate valve opening is smaller than the boundary opening $x_b$.

Figure 12:
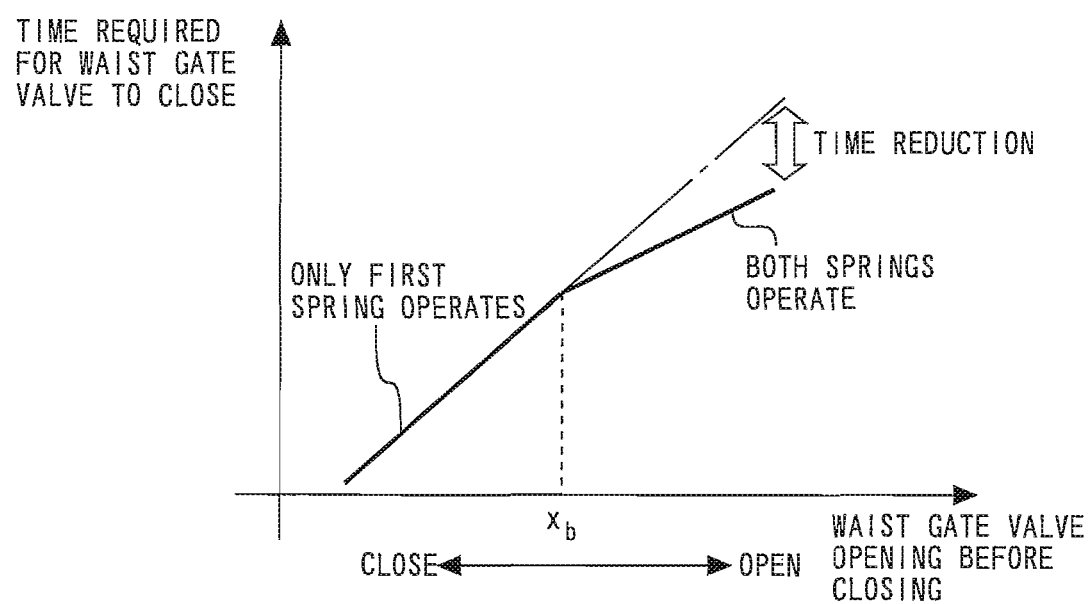
FIG. 12 is a graph for illustrating a time required to close a waste gate valve.

FIG. 12 is a graph for illustrating the time required to close the waste gate valve 28. In FIG. 12, the ordinate indicates the time required to change the diaphragm pressure to a pressure enough to close the waste gate valve 28, that is, the time required for the waste gate valve 28 to close, and the abscissa indicates the initial waste gate valve opening (the waste gate valve opening before closing). As shown in FIG. 12, the larger the waste gate valve opening before closing, the longer the time required for the waste gate valve 28 to close. If that there is no second coil spring 78, and only the first coil spring 74 is provided, the time required for the waste gate valve 28 to close increases in proportion to the waste gate valve opening before closing, as shown by the alternate long and short dash line in FIG. 12. Therefore, when the waste gate valve opening before closing is large, the time required for the waste gate valve 28 to close is long accordingly and may have an adverse influence on the acceleration response.

However, according to this embodiment, the second coil spring 78 is provided. As a result, the biasing force acting on the waste gate valve 28 in the direction to close the waste gate valve 28 can be enhanced when the waste gate valve opening is larger than the boundary opening $x_b$. Consequently, as shown by the thick solid line in FIG. 12, the time required for the waste gate valve 28 to close can be prevented from being excessively long even when the waste gate valve opening before closing is larger than the boundary opening $x_b$. In this way, according to this embodiment, even when the waste gate valve 28 is wide open, the waste gate valve 28 can be quickly closed in response to the occurrence of an acceleration request, and therefore, good acceleration response is achieved.

Although setting of the boundary opening $x_b$ is not particularly limited, the boundary opening $x_b$ is desirably set at an opening equal to the minimum waste gate valve opening at which the flow rate of the exhaust gas that passes through the bypass channel 26 when the waste gate valve 28 is opened under a predetermined operation state of the engine 10 is saturated (that is, the saturation minimum opening).

As described above with regard to the embodiment 1, when the waste gate valve 28 is opened to improve the fuel consumption characteristics, the maximization of the improvement of the fuel consumption characteristics and the best possible acceleration response in the case where an acceleration request occurs can be achieved at the same time by making the waste gate valve opening agree with the saturation minimum opening. If the waste gate valve opening is larger than the saturation minimum opening, it means that the waste gate valve 28 is open wider than necessary, and thus, the waste gate valve 28 is desirably closed to the saturation minimum opening. Setting the boundary opening $x_b$ at the saturation minimum opening has an advantage that the waste gate valve 28 can be quickly closed to the saturation minimum opening when the waste gate valve 28 is open wider than the saturation minimum opening.

In the case where the boundary opening $x_b$ is set to be equal to the saturation minimum opening, the saturation minimum opening is the saturation minimum opening under the predetermined operation state of the engine 10 as described above. As described with regard to the embodiment 1, the saturation minimum opening varies depending on the engine operation state (the engine speed and the engine load rate). Therefore, the boundary opening $x_b$ is desirably set to be equal to the saturation minimum opening under the engine operation state that is expected to most frequently occur. Under the other engine operation states, the boundary opening $x_b$ does not accurately agree with the saturation minimum opening. However, the range of the variation of the saturation minimum opening relative to the variation of the engine operation state is not significantly wide. Therefore, if the boundary opening $x_b$ is set to be equal to the saturation minimum opening under the predetermined engine operation state, the boundary opening $x_b$ is close to the saturation minimum opening under the other engine operation states. Thus, the advantages described above can also be achieved under the other engine operation states.

In the embodiment 3 described above, the first coil spring 74 and the second coil spring 78 correspond to the "biasing means" according to the fourth invention. However, the configuration of the "biasing means" according to the fourth invention is not limited to this configuration, and any configuration is possible which satisfies the requirement that the rate of increase of the biasing force relative to the increase of the waist gate valve opening is higher when the waist gate valve opening is larger than a predetermined boundary opening than when the waist gate valve opening is smaller than the predetermined boundary opening.

REFERENCE SIGNS LIST

10 engine
14 intake path
16 exhaust path
20 turbocharger
22 turbine
24 compressor
26 bypass channel
28 waste gate valve
30 diaphragm type actuator
32 link
62 diaphragm
64 high pressure chamber
66 low pressure chamber
68 connection port
72 rod
74 coil spring
78 second coil spring
84 electrical pump
86 pressure regulating valve

The invention claimed is:

1. A control apparatus for an internal combustion engine, comprising:
    a turbocharger having a turbine disposed in an exhaust path of the internal combustion engine and a compressor disposed in an intake path of the internal combustion engine;
    a waste gate valve that opens and closes a bypass channel that connects a part of the exhaust path upstream of the turbine and a part of the exhaust path downstream of the turbine to each other;
    a drive mechanism that drives the waste gate valve;
    an electronic control unit having an input side connected to one or more sensors, the electronic control unit programmed to:
        control the drive mechanism to hold the opening of the waste gate valve at a saturation minimum opening when the drive mechanism opens the waste gate valve;
        obtain the saturation minimum opening from a fundamental opening map defining a relationship between an operation state of the internal combustion engine and the saturation minimum opening;
        estimate a pressure in the part of the exhaust path downstream of the turbine based on an amount of fresh air using a stored map;
        estimate a pressure in the part of the exhaust path upstream of the turbine either based on a supercharging pressure from a supercharging pressure sensor, the amount of fresh air, and the estimated pressure in the part of the exhaust path downstream of the turbine, or based on the waste gate valve opening, the amount of fresh air, and the estimated pressure in the part of the exhaust path downstream of the turbine;
        determine a second saturation minimum opening of the saturation minimum opening based on a turbine downstream pressure acquired by the electronic control unit and a turbine upstream pressure acquired by the electronic control unit; and
        control the drive mechanism so that, if there is a difference between the second saturation minimum opening and the saturation minimum opening, the saturation minimum opening approaches the second saturation minimum opening.

2. The control apparatus for an internal combustion engine according to claim 1, comprising a biasing member configured to apply a biasing force to the waste gate valve in the direction to close the waste gate valve,
    wherein the biasing member is configured to increase the biasing force as the waste gate valve opening increases, and the rate of the increase of the biasing force relative to the increase of the waste gate valve opening is higher when the waste gate valve opening is larger than a predetermined boundary opening than when the waste gate valve opening is smaller than the predetermined boundary opening.

3. The control apparatus for an internal combustion engine according to claim 2, wherein the boundary opening is set at an opening equal to the minimum waste gate valve opening at which the flow rate of the exhaust gas passing through the bypass channel when the waste gate valve is opened under a predetermined operation state of the internal combustion engine is saturated.

* * * * *